Feb. 27, 1962  A. G. BODINE, JR  3,022,814
METHOD AND APPARATUS FOR SONIC BONDING
Filed Feb. 4, 1957  3 Sheets-Sheet 1

INVENTOR.
ALBERT G. BODINE, JR.
BY
ATTORNEY.

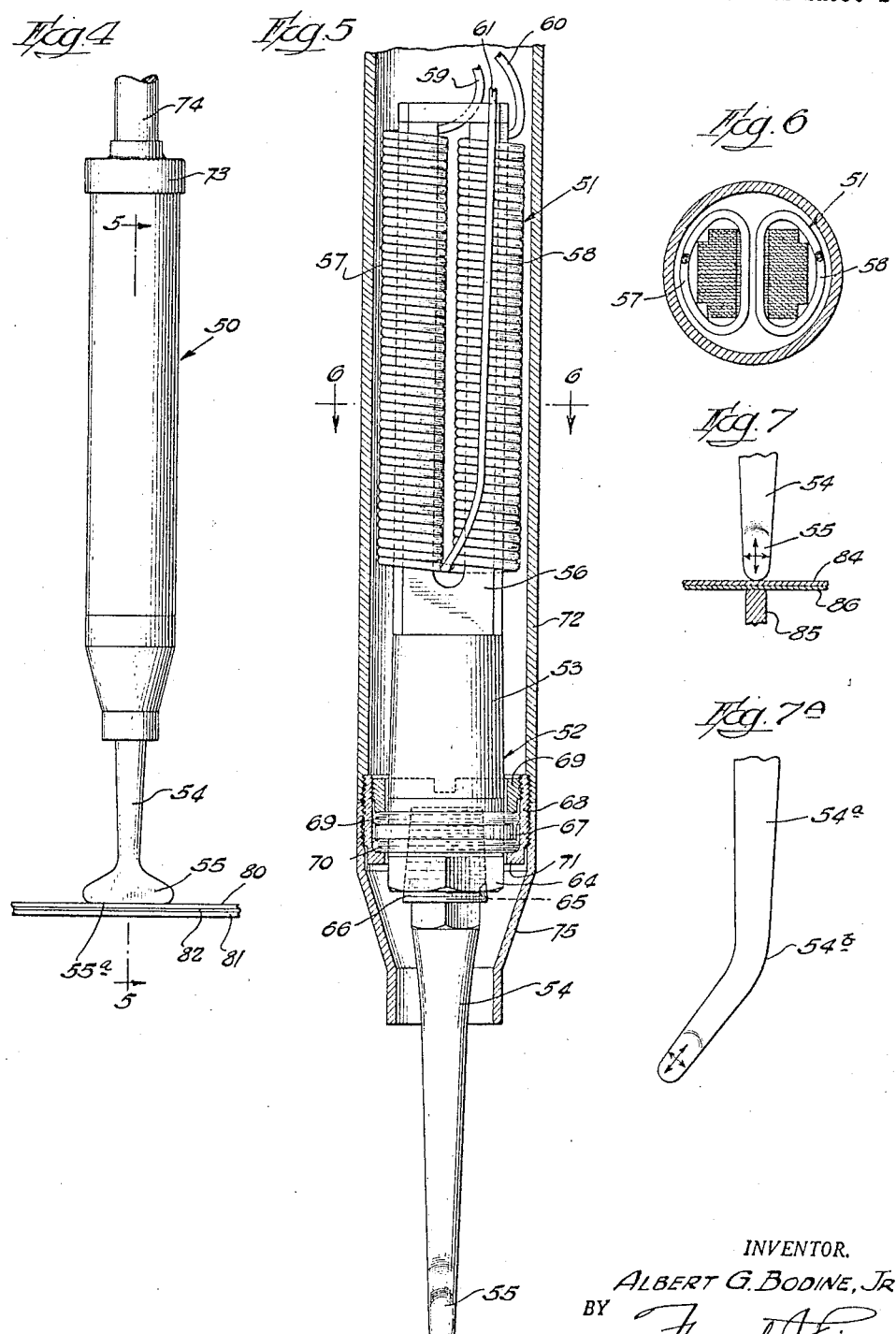

Feb. 27, 1962 A. G. BODINE, JR 3,022,814
METHOD AND APPARATUS FOR SONIC BONDING
Filed Feb. 4, 1957 3 Sheets-Sheet 3
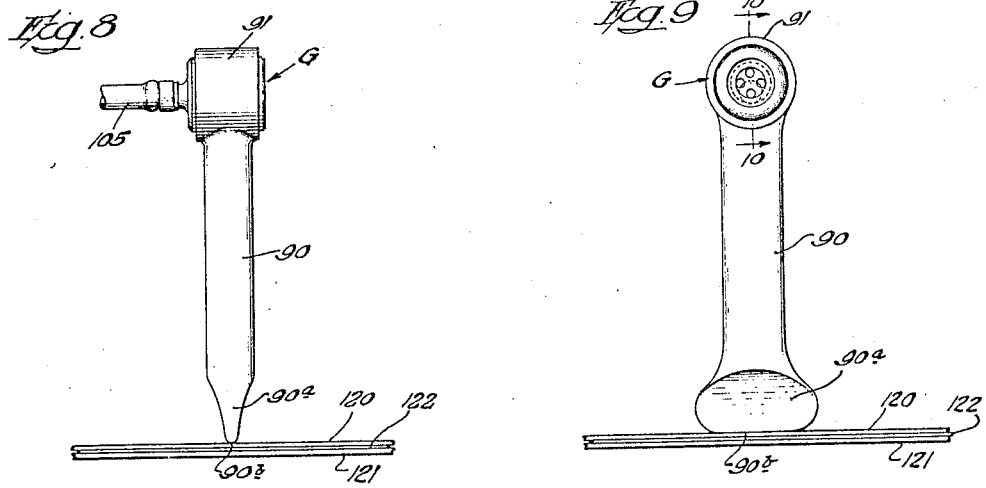
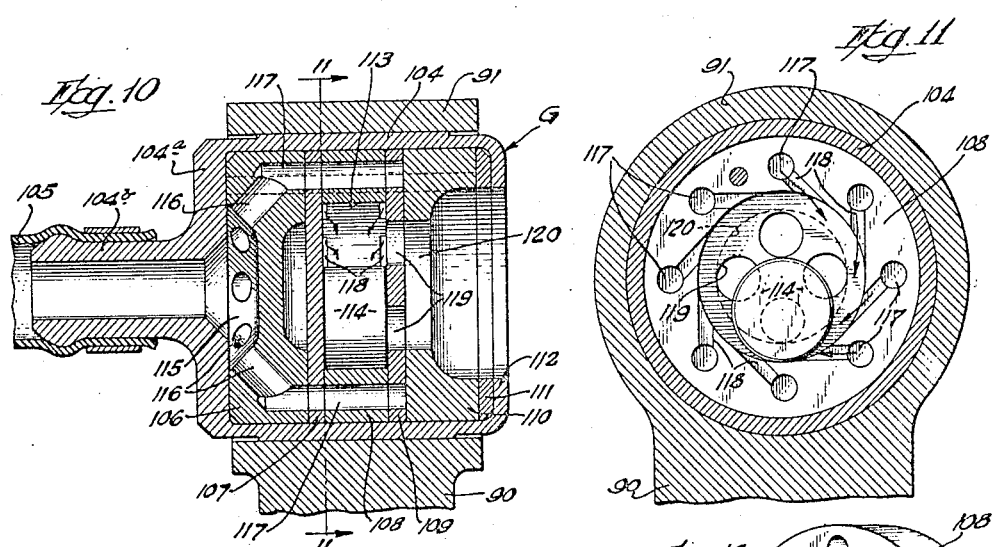
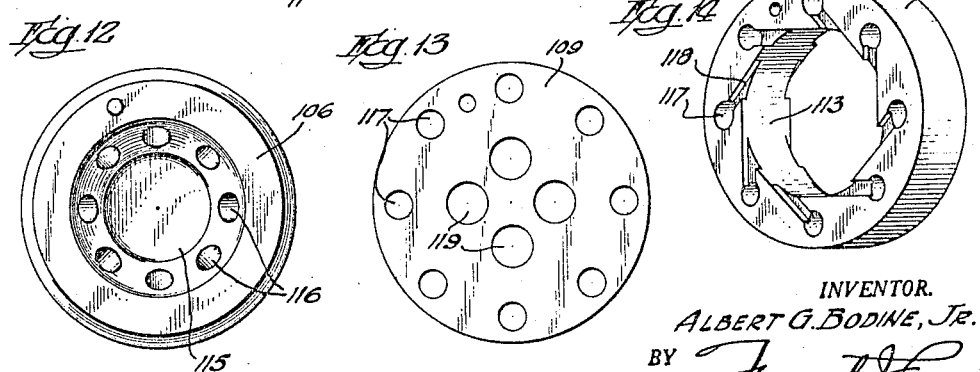
INVENTOR.
ALBERT G. BODINE, JR.
BY
ATTORNEY.

United States Patent Office 3,022,814
Patented Feb. 27, 1962

3,022,814
METHOD AND APPARATUS FOR SONIC BONDING
Albert G. Bodine, Jr., Van Nuys, Calif.
(13120 Moorpark St., Sherman Oaks, Calif.)
Filed Feb. 4, 1957, Ser. No. 637,941
20 Claims. (Cl. 156—73)

This invention relates generally to sonic methods and apparatus for accomplishing welding or bonding of parts using thermoplastic materials, and the general object of the invention is to accomplish improved thermoplastic bonding. The invention contemplates bonding of two thermoplastic articles to one another, bonding of thermoplastic articles to other members, and welding or bonding of two members to one another using a thermoplastic material as a bonding agent.

A sheet of thermoplastic material can be made to become soft and tacky by passing an intense high frequency sound wave through it. The energy of the sound wave is converted to heat within the plastic material, temporarily reducing it to its softened thermoplastic state, whereupon two layers of plastic will flow together and become welded; or, such plastic material between two other materials, e.g., two sheets of metal, becomes an adhesive. After the sound wave field is removed, the plastic cools and solidifies; and by establishment of certain later described conditions in accordance with the invention, a strong bond is formed. The sonic waves used are typically, though without limitation thereto, in a frequency range of from a few hundred to several hundred thousand cycles per second or even higher. The frequency is usually in the upper range of the audible spectrum, or above.

It will be understood that useful vibration in this connection involves vibratory elastic bending, deformation or "working" of the material, rather than mere bodily vibration. Such vibratory elastic bending, deformation, or working is quite substantial and energy consuming in the case of plastic substances, as contrasted with hard, metallic, or bell-like materials, which tend to vibrate freely, rather than with internal "working."

In that aspect of the invention which contemplates the bonding of one plastic member to another, one especially important practice thereof consists in uniting two plastic sheets along a fused junction line, as though the two sheets were "stitched." This aspect of the invention includes a further important step consisting in cooling the "seam," under compression, immediately following fusion, which has the effect of solidifying the bond while the plastic members are being pressed together, thereby effectively enhancing the security and effectiveness of the bond.

In that aspect of the invention which contemplates the bonding of two members by an intervening layer of plastic material, important improvements are effected in various applications, such as the uniting of two sheets of metal to one another along a lap joint, or the uniting of a sheet of metal to any underlying structure, such as spaced ribs. In such cases, a ribbon of the plastic material may be laid between a sheet of metal and the next adjacent structure, either another sheet of metal or a rib, and the high frequency sound waves are then transmitting to the plastic substance by applying a sonic, high frequency vibrating member to the outside surface of the uppermost sheet. The plastic material is thereby selectively heated and melted, and upon cooling, forms a bond between the two metal members. The metal members remain cool, and chill and solidify the plastic material as soon as the flow of sonic energy is stopped. Such long bonds, of uniform stress under shear load, can be superior to a riveted lap joint.

Prior attempts to vulcanize or "glue" sheet metal structures have not been entirely practicable or widely applicable because of the inherent awkwardness in having first to paint the mating surface, and then to quickly place the sheet metal in position and maintain pressure until the adhesive is set. With such processes there is a large personal factor dependent upon the skill and speed of the operator, resulting in lack of uniformity, and common poor results which may not be evident until the bonded assembly fails. An advantage of the present invention over such prior art practices is that the mechanic is enabled to locate the parts without undue rush or anxiety before he commences the bonding operation. A unique advantage of the invention mentioned just above is the fact that the high frequency sound waves pass through the solid structure, e.g., sheet metal, without causing any material heating thereof, but as they pass on through the soft plastic material, the latter becomes soft and tacky, and remains so while the sound waves are applied. As soon as the sound waves are discontinued, the plastic material is quickly chilled and set by the relatively cool surfaces of the adjoining solid structure.

Proposals have been made for fastening parts, such as aircraft sheet metal members, by vulcanizing with a rubber-like material. The problems involved include the fact that if the bonding material between the parts is heated by heating the parts, an undesirable distortion of the parts results. By contrast, according to my method, sonic energy is transmitted through the part into the plastic bonding material where it is absorbed because of the greater elastic hysteresis of the latter. In this way, the bonding material is heated, and other parts receive a minimum of heating. These other parts hence are not subject to distortion by heat; moreover, remaining cool, they rapidly cool the fused plastic as soon as the sonic vibration is interrupted, and thus set the bond.

Apparatus for carrying my invention into practice may be a sonic vibratory tool comprising usually a longitudinally vibratory rod, operated by a magneto-striction driver or the like, and characterized by high frequency vibrations at relatively minute amplitude, designed for direct contact with either the plastic material (in case two plastic members are to be bonded to one another) or to a solid overlying structure, e.g., a metal sheet, through which the sonic energy is transmitted to and into the plastic material by a short, direct path, where it is absorbed and heats the material to the desired tacky state. In the first case, a cooling element is applied, under pressure, to cool and solidify the bond under compression. In the second case, the bond is chilled, when sonic vibration is stopped, by the cool metal. As an additional step, the bond, in the second case, can in some instances be further improved by holding it under compression during chilling. In one practice of the invention, the bonding material can be sonically fastened or fused to a sheet metal member at desirable points at any time before it is desired to fasten the sheet to another structure. Then, to fasten the sheet to the structure, it is only necessary to hold the sheet with the bonding material in contact with the proper mating surfaces on the structure, such as ribs or the like. The sonic energy is then applied on the outside of the sheet near the bonding material. The plastic bonding material is selectively heated and converted to its tacky state, in which condition it flows into intimate contact with the solid structure; the material rapidly sets, cooled by the adjacent metal when the sonic energy is stopped, permanently fused to the adjacent structure. A modified form of my sonic tool which generates lateral vibration will, when held against the outside surface of an overlying metal sheet, cause a high frequency minute amplitude sliding action of the bonding material against an underlying rib, generating elastic stresses having the nature of acoustic shear waves. In this way the bonding material is heated the greatest at its contact with the rib, and a bond may be effected at that point without impairment of a previously made bond to the sheet elsewhere.

A highly important and beneficial feature of the invention resides in the fact that in all forms of the invention, the thermoplastic material is surface cooled or chilled simultaneously with internal sonic heating thereof. In that aspect of the invention which contemplates the bonding of one plastic member to another, the surface cooling means comprises the sonic vibratory tool itself, and, in some cases, also an auxiliary "heat sink," which contact and carry heat away from the surface of the material being sonically heated. In that aspect of the invention which contemplates bonding two members by an intervening layer of thermoplastic material, the surface cooling means comprise the members themselves.

Surface cooling of the thermoplastic material induces a flow of heat outwardly from the material as it is internally sonically heated which results in substantially instantaneous setting of the bond produced by heating. That is to say, the material under the vibratory tool is subject to intense vibrations and thereby rendered tacky internally so that fusing occurs, as already discussed. Surface cooling of the material creates a temperature gradient that induces a continuous outward flow of thermal energy or heat from the interior of the material simultaneously with the inward flow of sonic energy into the material to heat the latter. The latest theoretical explanation of the inherent advantage of this simultaneous, opposed thermal-acoustic energy flow is that the energy pattern, with the counter direction of the two energy gradients, causes a better interlocking of the molecular elements of the plastic material and, therefore, an improved bond. As a further consequence, after sonic heating of a particular portion of the material is discontinued, either by feeding movement of that portion out of the field of intense vibration directly below the vibratory tool or cessation of the vibrations, the already existing temperature gradient and outward flow of heat produces an immediate chilling and setting of the fusion bond.

In other words, the simultaneous surface cooling and sonic heating action involved in the practice of the invention gives rise to two simultaneous and opposed energy gradients or flows, namely, a sonic energy flow to the thermoplastic material and a thermal energy flow from the material to the sonic radiator or other surface cooling means which results in instantaneous cooling of the fusion bond upon interruption or discontinuance of sonic heating. Surface cooling simultaneously with sonic heating also removes heat from the material immediately adjacent to the zone of the material where sonic heating occurs and thereby prevents impairment of adjacent fusion bonds. Final cooling of the bond may occur under pressure, as already noted.

The invention will be further understood from the following detailed description of certain present illustrative embodiments thereof, reference for this purpose being had to the accompanying drawings, in which:

FIG. 4 is an elevational view of a modified form of the invention;

FIG. 5 is a section taken on line 5—5 of FIG. 4;

FIG. 6 is a section taken on line 6—6 of FIG. 5;

FIG. 7 illustrates a modified practice of the invention;

FIG. 7a shows a modified shank for the sonic tool;

FIG. 8 is a side elevation of a further modification;

FIG. 9 is an elevation of the subject matter of FIG. 8, looking from the right;

FIG. 10 is a section on line 10—10 of FIG. 9;

FIG. 11 is a section on line 11—11 of FIG. 10;

FIG. 12 is a detail elevation of an end plate taken from FIG. 10;

FIG. 13 is a detail elevation of a wear plate taken from FIG. 10; and

FIG. 14 is a perspective of a raceway plate taken from FIG. 10.

Figure 1:
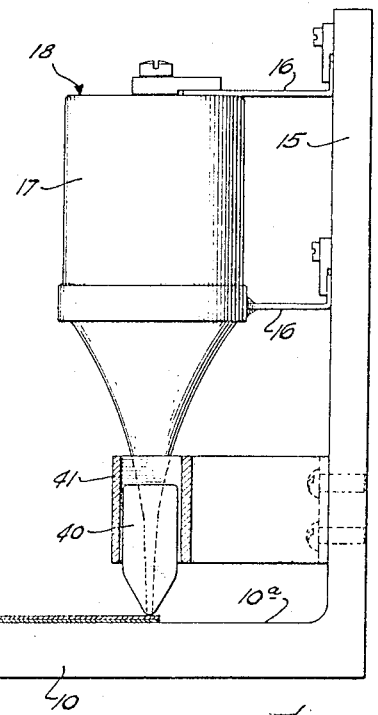
FIG. 1 is an end elevational view of an apparatus in accordance with the invention, certain parts being broken away.
Figure 2:
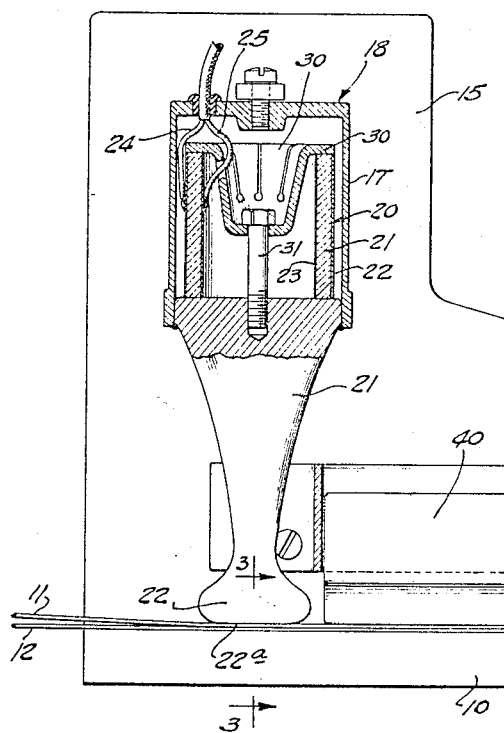
FIG. 2 is a front elevational view of the apparatus of FIG. 1, with parts in section.
Figure 3:
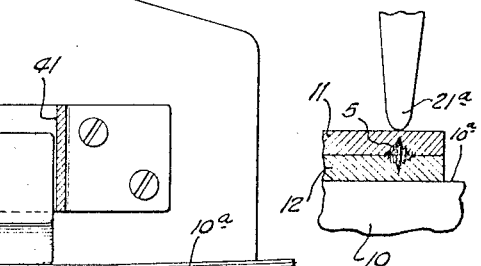
FIG. 3 is a detailed section taken on line 3—3 of FIG. 2.

Referring first to the embodiment of FIGS. 1–3, numeral 10 designates generally a horizontal table having a smooth, plane upper surface 10a for sliding support of the sheets of plastic material to be welded. In the drawings, upper and lower such plastic sheets, 11 and 12, respectively, are positioned in contact with one another on said surface 10a, and it is to be understood that the two sheets are to be welded or fused to one another along a line near to and parallel with corresponding or adjacent longitudinal edges thereof.

Rising from the rearward edge of table 10 is a vertical wall 15, which supports, by means of suitable brackets 16 and 17, the cylindrical case 17 of a sonic tool generally designated by the numeral 18.

The sonic tool 18 comprises essentially a vibratory driver or generator unit 20, and a longitudinally vibratory horn-like rod or bar 21 formed at its extremity with a suitably shaped foot 22 adapted for application to the plastic material.

The driver 20 may be any suitable high frequency vibrator. For a frequency below about 10,000 c.p.s. a mechanical vibrator is most suitable. In the range from 10,000 to several hundred thousand c.p.s., a magnetostriction or barium titanate vibrator is appropriate. Crystal vibrators may be used for still higher frequencies. All such types of driver are known in the art and need not be elaborately described herein. The illustrative driver 20 is of the barium titanate type, comprising a barium titanate cylinder 23, composed as known in the art, and provided on its inside and outside surfaces with silvered coatings such as indicated at 24 and 25, respectively. Leads 26 and 27 are connected to these coated surfaces and led out through casing 17, to a suitable power source, which will be understood to comprise an oscillator of the requisite frequency, together with a suitable amplifier. As is well known, a barium titanate cylinder, energized on its opposite surfaces with a high frequency alternating current, alternately elongates and contracts, at the frequency of the driving current. The cylinder 23 of course has a natural resonant frequency, and accordingly is preferably dimensioned to operate at resonance at the designed operating frequency, and the driving oscillator will be understood to be adjusted to supply power at this frequency.

Cylinder 23 seats on the upper end of vibratory bar 21, and is clamped thereto by spring saddle 30 and screw 31. The saddle 30, as here shown, comprises a slotted, cup-shaped part with a flange portion 31 bearing on the upper end of cylinder 21, and is normally stressed by means of screw 31, so as to be capable of resilient elongation and contraction to accommodate the alternate elongation and contraction of cylinder 21.

The rod or bar 21 preferably tapers toward its lower extremity. As seen in the aspect of FIG. 1, the taper may be substantially exponential, the rod terminating in the aforementioned foot 22 which presents at the bottom a narrow tip portion 21a. As seen in the aspect of FIG. 2, however, the member 21 tapers to a point a little short of its lower extremity and then widens to form the somewhat elongated foot 22, the lower surface of the latter being flat and elongated, as at 22a. It will be seen that the elongation of the foot 22 is in the direction of the line of juncture to be formed between the two plastic sheets 11 and 12.

The rod 21 and cylinder 23 taken together are dimensioned to have a length equal to a half wavelength, or multiple thereof, for the frequency of operation of the driver 20. Rod 21 is composed of a suitable material of good elastic fatigue properties, such as steel, nickel, Dural or the like. The tapered form of this bar amplifies the vibration amplitude at its foot.

As viewed in FIG. 2, the two plastic sheets 11 and 12 to be joined along a line adjacent corresponding edges thereof, are moved continuously from left to right during operation of the process. Immediately to the right of the bar 21, the plastic sheets are engaged by the lower tapered extremity of a cooling iron 40 freely mounted for vertical movement in a suitable guide 41 affixed to frame wall 15.

In the operation of the system, the barium titanate cylinder 21 elongates and contracts at high frequency, as heretofore explained. The cyclic longitudinally directed force thus applied to the upper end of elastic bar 21 sets the latter into longitudinal vibration, the lower extremity of member 21 becoming a velocity antinode of this vibration, and there being one or more intermediate nodes along the length of the assembly, depending upon its length in terms of half wavelengths. As above mentioned, the tapered form of the member 21 accomplishes an amplification of the stroke at its lower end. This amplification is desirable in that it increases the amount of vibratory "working" of the plastic when the foot 22 is applied to the latter. The foot 22 of the vibratory member 21 will be seen from the drawings to bear on the upper surface of the uppermost of the two plastic layers or sheets on the table 10. As the foot 22 vibrates in contact with the superimposed plastic sheets, the plastic substance is set into rapid elastic vibration, of relatively minute amplitude. The material is alternately compressed and relieved, and the resulting cyclic deformation or "working" of the material causes rapid heating by internal friction and consequent energy consumption. The heating occurs directly beneath the narrow (see FIGS. 1 and 3) lower extremity of foot 22, and the material becomes soft and tacky within an area such as indicated at s in FIG. 3. Within this area, the material fuses and unifies. The continuously traveling sheets 11 and 12 pass in this state from the vibratory foot 22 to the cooling iron 40, which comprises both a heat sink, of sufficient capacity to cool the material and cause it to set by the time it has passed therebeyond, and a weight to hold the sheets under compression while the plastic material is being cooled and solidified. The material is thus unified along a longitudinal line as though stitched. The cooling iron 40 may of course be replaced from time to time if it becomes heated, or suitable cooling provisions may be provided, not necessary here to show. Normally the radiation into room air from a relatively large body like 40 is sufficient.

It is evident that cooling iron 40, vibrating foot 22 and the table 10 act as heat sinks to remove heat from and cool the surfaces of the plastic sheets 11 and 12 while they are being internally sonically heated. As preliminarily discussed, this surface cooling during sonic heating establishes a temperature gradient in the sheets simultaneously with and in opposition to the acoustic energy gradient which induces a continuous flow of heat from the sheets as they are heated and results in instantaneous cooling of the fusion bond produced by heating upon movement of the bond from the zone of intense vibration directly below the vibratory tool.

In FIGS. 4–6 is shown a hand tool type version of the invention, and in this case, the tool is shown in that application of the invention involving the bonding of two metallic members to one another by an intervening layer of plasitc material. The sonic tool is in this instance indicated generally by the numeral 50, and comprises essentially vibratory driver unit 51, in this case of the magneto-striction type, and longitudinally vibratory member 52, made up in this case of socketed body member 53 and a removable shank 54, the latter having at its extremity a narrow, elongated foot 55. The magnetostriction driver 51 comprises the usual laminated core 56 made up of thin laminae of nickel, the two legs of which carry windings 57 and 58. As shown, the windings 57 and 58 are series connected, and have terminal leads 59 and 60, respectively, and there is also shown an optional center tap lead 61.

The core 56 stands on and is brazed to the uppermost end of vibratory member 53, and the latter is formed at its lower extremity with wrench faces 64, and with a threaded socket 65 for the threaded upper end extremity 66 of shank 54, the latter having wrench faces 66 immediately below threaded portion 66. The described wrench faces permit tight installation of the shank into body 53. Body 53 has near its lower end an external annular flange 67 which is received inside the bore of an externally threaded ring 68. An externally threaded retainer ring 69 is screwed into a threaded socket in the upper end of ring 68 and the aforementioned flange 67 is positioned between a pair of rubber cushioning rings 69 and 70, the former being engaged by the lower end of retainer ring 69, and the latter seating on an internal annular flange 71 at the lower end of ring 68. Ring 68 screws into the lower end of cylindrical casing 72, which has at the top a cap 73, through which extends cable 74 understood to carry the aforementioned leads 59, 60 and 61. A conical shell 75 screws onto ring 68 below casing 72 to house the upper end portion of vibratory shank 54.

As here shown the shank 54 tapers slightly in a downward direction to the narrow, elongated foot 55, and said foot has a horizontal elongated lower surface 55a adapted to contact the member to which sonic energy is to be applied. The magneto-striction device 51 is of a well known type, and it will be understood that the core 56 thereof alternately elongates and contracts in step with the frequency of an alternating current fed thereto from a suitable power source, and that the range of frequency may be, for example, though without limitation, of the order of a few hundred to hundreds of thousands of cycles per second. The length of core 56 may preferably be such as to have a natural resonant frequency for a longitudinal mode of vibration corresponding to the frequency of the power source. The length of the vibratory member made up of core 56, body 53 and shank 54 is, as in the case first described, of a length corresponding to a half wavelength, or multiple thereof, for the frequency at which magneto-striction driver is energized.

In FIG. 4, I have shown the foot 55 applied to the upper surface of a sheet metal member 80 which is to be bonded to underlying sheet metal member 81, there having been placed an intervening layer 82 of theremoplastic material between the two. Application of the sonically vibrating foot 50 to sheet 80 causes transmission of sonic energy directly through the sheet 80 to the plastic layer 82 through a path which is thus short and direct. The plastic material, being relatively soft and resilient as compared with the metal sheets 80 and 81, is thereby set into substantial vibratory action, the material being alternately compressed and expanded, and generally worked and agitated. Under these conditions, the sonic wave energy is converted to heat by the internal friction of the plastic substance, and this heating softens the plastic material and reduces it to a tacky state. In this condition, it flows into intimate contact with the adjoining surfaces of the two metal sheets 80 and 81; and when the sonic tool is removed, the plastic material quickly cools and sets, fused tightly and permanently to the two sheets 80 and 81. The cooling is very materially aided by the sheets 80 and 81 themselves, which are not materially heated by the sonic action, and serve to convey away and dissipate the heat. In some cases, it is desirable to maintain the bond under compression while cooling and solidifying, and to this end the tool may be pressed downwardly on the upper sheet 80 for a short time, after stopping the sonic vibration, until the bond is cooled.

Thus, the process involves, essentially, selective heating of the intervening plastic substance to the point of melting and fusing, while the metallic sheets 80 and 81 remain cool, and aid in quickly cooling and setting the bond. Optionally, the invention includes the further step of holding the bond under compression during the cooling stage.

Since the metal sheets 80 and 81 remain cool during sonic heating of the thermoplastic material therebetween, there is established, as before, a temperature gradient in the plastic material simultaneous with and in opposition to the acoustic energy gradient that effects the sonic heating. This temperature gradient becomes immediately effective to chill and set the fusion bond upon interruption of the vibrations.

It will be appreciated that the tools heretofore described are characterized by longitudinal vibration of the vibratory rod and foot applied to the work, such that the foot moves toward and then recedes from the work, alternately compressing and expanding the plastic substance. It has been mentioned earlier herein that lateral vibration may be combined with such longitudinal vibration, and such is of advantage in many applications. For example, as shown in FIG. 7, it may be desired to bond a metallic sheet 84 to one or more ribs such as 85. A ribbon 86 of plastic may be preliminarily bonded to the under surface of the metal sheet 84 under the area which is to be joined to the rib 85, and this may clearly be accomplished in accordance with obvious application of the invention. The sheet 84 with the plastic substance bonded thereto may then be placed over the rib 85, as shown in FIG. 7, and the vibratory foot 55 of the sonic tool of FIGS. 4–6 then applied, as indicated. In such case, it is of additional advantage if the foot 55 has lateral vibration as well as longitudinal vibration, and this can be accomplished, illustratively, with the tool of FIGS. 4–6, by using one coil only, such as 57, of the magneto-striction driver 51. For example, the source of oscillatory power may in such case be connected across leads 59 and 61, energizing coil 57 only. In such case, the magneto-striction driver vibrates longitudinally, as before, but in view of the evident dynamic unbalance of the driving force for the assembly (magnetic leakage preventing equal flux in the two legs), a strong lateral mode of vibration is established, causing shank 54 and foot 56 to vibrate laterally as well as longitudinally, as indicated by the double-headed arrows in FIG. 7. A lateral component of vibration can also be introduced by using a bent shank 54a, i.e., formed with a knee 54b, as illustrated in FIG. 7a. Such lateral vibration causes the plastic layer to be shear-stressed laterally relative to the upper surface of the rib 85, in addition to its vertical vibratory compression, and the resulting lateral sliding action generates additional local heat at the point of contact between the plastic substance and the rib. Thus there is generated additional heat at this point of contact, so that the material fuses to the rib prior to heating of the previously made bond between the plastic substance and the overlying sheet 84 to the point where the latter bond is loosened or impaired. Here, again, surface cooling of the plastic material 86 by the metal sheet 84 and the rib 85 during sonic heating of the plastic is beneficial since heat is continuously drawn away from the plastic immediately adjacent to the portion thereof being sonically heated. Fusion bonds already made in adjacent areas of the material are thereby maintained cool and are not impaired.

FIGS. 8 to 14 show another embodiment of the invention, using an air-driven vibration generator of a type designed to produce both longitudinal and lateral components of vibration in the tool applied to the work, whereby there is secured a combination of compression and shear vibration in the plastic material.

The tool in this case comprises a shank 90 having at its lower end a foot 90a, thinned in one dimension and longitudinally extended in the other, with a narrow flat surface 90b at the bottom, as clearly shown in FIGS. 8 and 9.

The upper end of this shank 90 has a hub 91 into which is press fitted the cylindrical housing 104 of gyratory vibration generator generally designated by numeral G. Housing 104 has end wall 104a provided with nipple 104b to which is attached compressed air supply hose 105. Mounted inside housing 104 are a series of plates, and air inlet plate 106 immediately adjacent wall 104a, a wear plate 107, a raceway plate 108, a second wear plate 109, and finally an end plate 110, these plates being backed up by a washer 111, in back of which is a flange 112 formed by spinning over the end portion of housing 104. Raceway plate 108 is centrally bored to form annular raceway 113, and contained within the chamber defined by this raceway is a cylindrical roller 114, it being noted that the said chamber is defined at the sides by the two plates 107 and 109. In the present case the diameter of the roller 114 is a little over half that of the diameter of the raceway 113, as clearly appears in FIG. 10.

Air under pressure entering through nipple 104b is received initially in a chamber 115 in the front side of plate 106, and flows from there via a plurality of divergent passageways 116 to a corresponding plurality of passageways 117 which extend parallel to the axis of housing 104 from the outer ends of passageways 116 through plates 107, 108 and 109, to terminate at the adjacent face of plate 110. This air in passageways 117 is discharged into the rotor chamber via nozzle grooves 118 cut in opposite faces of plates 108 and leading from the passageways 117 to the annular raceway 113, opening into the latter in a tangential direction. The tangentially introduced air causes the roller 114 to spin about the raceway 113, and to exert a gyratory force on the generator casing. The spent air is discharged to atmosphere through ports 119 in the central portions of plate 107, and central opening 120 in end plate 110.

The foot 90a of shank 90 is shown in FIGS. 8 and 9 as pressed down against a sheet metal plate 120, overlying a second sheet metal plate 121, between which is a layer 122 of thermoplastic material. The air driven generator G, by reason of the spinning rotor 82, tends to gyrate and to move the upper end of the shank 90 with a bodily circular motion of substantial power but small amplitude. This motion at the head of upper end of shank 90, may bodily move the shank 90, moving it both up and down and laterally, through small amplitude movements, causing the foot 90a to move with components of motion both perpendicular to plate 120 and parallel thereto; or, depending upon correlation of the length and cross sectional dimensions of shank 90 with respect to the spin rate of the rotor 82, lateral or longitudinal sound wave patterns may be established in the shank 90. Thus, as the spin frequency of the rotor is raised, the frequency reaches a resonant frequency for a lateral mode of vibration in the shank, and at and around this frequency, the lateral vibration mode is predominant, and the foot 90a has a large component of vibration parallel to the plate 120, and a smaller component of vibration at right angles thereto. As the spin frequency is raised higher, the resonant frequency for longitudinal vibration is reached, and the longitudinal component of vibration then predominates. The vibration amplitude normal to the plate 120 then exceeds the amplitude parallel to plate 120. The spin frequency, of course, is regulated by the air pressure admitted to generator G.

Thus various combinations of vibration, normal (compressional) and parallel (shear) to sheet 120, can be applied. As explained hereinbefore, a combination of compressional vibration with shear vibration is particularly effective in heating the intervening plastic layer and causing it to fuse. The apparatus of FIGS. 8–14 is one combining high power, the advantage of purely mechanical equipment and selectivity of proportions of compressional and shear vibration for best results in any practical application.

The invention further contemplates the application of both longitudinal and lateral components of vibration to the fusing of two thermoplastic sheets or bodies to one another, using, for example, either the tool of FIGS. 4–7, in its laterally unbalanced mode of operation, the bent shank of FIG. 7a, or the tool of FIGS. 8–14, applied, for example, to two overlying sheets of thermoplastic material as shown in FIGS. 1 and 2, with advantages contributed by the lateral component as mentioned in the foregoing.

This invention has now been disclosed in several exemplary forms. It will be understood, however, that these are for illustrative purposes only, and that various changes in design, structure and arrangement may be made without departing from the spirit and scope of the appended claims.

I claim:

1. The method of bonding two thermoplastic bodies to one another that comprises: placing the bodies in contact with one another sonically, vibrating contacting portions of the bodies to generate heat therein until the contacting surfaces of the bodies become soft and tacky and fuse to one another, and simultaneously cooling the outer surface of at least one body to induce a flow of heat away from the fused surfaces of the bodies, then terminating the vibration, and completing the cooling of the bond under compression.

2. The subject matter of claim 1, wherein the plastic bodies are in sheet form, and the sonic vibration has a component substantially normal to the surfaces of said sheets.

3. The subject matter of claim 1, wherein the bodies are in sheet form, and the sonic vibration has a component substantially parallel to the surfaces of said sheets.

4. The method of bonding a thermoplastic material to a metal body that comprises: placing the thermoplastic material in contact with the metal body, and sonically vibrating the thermoplastic material while in such contact until it becomes soft and tacky and fuses to the metal body, and then terminating the vibration to permit cooling and setting of the bond by heat flow into the metal body.

5. The method of bonding a thermoplastic material to a metal body that comprises: placing the thermoplastic material in contact with the metal body, applying a sonic frequency vibratory tool to the metal body over the area to be bonded to transmit sonic vibratory energy through said body and into the thermoplastic material, thereby vibrating the thermoplastic material and selectively heating it, continuing such vibration until the thermoplastic material becomes soft and tacky and fuses to the metal body, and then terminating the vibration to permit cooling and setting of the bond by heat flow into the metal body.

6. The subject matter of claim 5, wherein the metal body is in the form of a sheet, and the sonic vibration has a component substantially normal to said sheet.

7. The subject matter of claim 5, wherein the metal body is in the form of a sheet, and the sonic vibration has a component of vibration parallel to said sheet.

8. The method of bonding two metal bodies to one another that comprises: placing a layer of thermoplastic material in a sandwich arrangement between the two metal bodies, applying a sonic frequency vibratory tool to an outside surface of one of the metal bodies over the area to be bonded to transmit vibratory energy through said body and into the thermoplastic material, thereby sonically vibrating and selectively heating the thermoplastic material, continuing such vibration until the thermoplastic material becomes soft and tacky and fuses to the adjacent surfaces of the two bodies, and then stopping the vibration to permit cooling and setting of the bond by heat flow into the metal bodies.

9. The subject matter of claim 8, wherein the two metal bodies are in sheet form, and the sonic vibration has a component substantially normal to said sheets.

10. The subject matter of claim 9, wherein the sonic vibration has also a component parallel to said sheets.

11. The subject matter of claim 9, including the further step of holding the sandwich formed by the two bodies and intervening layer of plastic under compression while the bond is cooled and solidified.

12. The method of bonding two bodies to one another using a thermoplastic material therebetween that comprises: transmitting sonic waves through one of the bodies into the material to generate heat in said thermoplastic material and reduce the material to a soft and tacky state and to cause the material to fuse to said bodies and simultaneously removing heat from the thermoplastic material through said bodies, and thereafter completing cooling of the thermoplastic material while holding the bodies compressed together to set the bond.

13. The method of bonding two bodies to one another, at least one of which is composed of a thermoplastic material that comprises: placing the bodies in contact with one another, sonically vibrating the thermoplastic body to generate heat therein until it becomes soft and tacky and fuses to the other body, and simultaneously dissipating heat from the bond to cool and solidify it through a cool metal heat conductor placed in contact with one of the bodies immediately over the bond.

14. The subject matter of claim 13, including the further step of holding the bonded bodies in pressural contact with one another while the bond is cooling and solidifying.

15. The method of bonding a thermoplastic material to a metal body, that comprises: placing the thermoplastic material in contact with the metal body, transmitting sonic waves through the metallic body to and into the thermoplastic material until the latter is selectively heated sufficiently to become soft and tacky and fuse to the metal body, and then terminating the vibration to permit cooling and setting of the bond by virtue of heat flow into the metal body.

16. The method of bonding two overlapping sheets of thermoplastic material to one another that comprises: drawing said overlapping sheets progressively along and in contact with a cool metal sonically vibrating tool, whereby to cause the portion of said sheets contacted by said tool to become selectively soft and tacky and to fuse to one another and a simultaneous flow of heat from the sheets to the tool, and then drawing said fused portions of said sheets along a cooling body maintained in pressural contact therewith to complete cooling and solidification of the heated and tacky sheets while compressed against one another.

17. The method of bonding a first metal body to a second that comprises: fusing a layer of thermoplastic material to a surface of the first body, applying said body with said material fused thereto into contact with a mating surface of the second body, applying to an outside surface of the first body a sonic frequency vibratory tool having a lateral component of vibration, so as to transmit vibratory energy through said body to said thermoplastic material, such vibratory energy having a component of vibration parallel to the body surfaces to be welded, whereby the thermoplastic material is given vibratory sliding movement relative to the mating surface of the second body, and is thereby locally and selectively heated to a soft and tacky state, and terminating the vibration prior to softening of the bond between the thermoplastic material and the first body, whereby a bond is made to the second body without impairment of the first made bond to the first body.

18. An apparatus for sonically bonding two plastic sheets to one another, the combination of: a table over which the sheets may be progressively drawn, a sonically vibratory tool for engaging and heating portions of said sheets to a tacky state while being moved over said table, and a cooling body positioned beyond said tool and in the line of travel of the heated and tacky portions of said sheets for pressurally engaging and cooling said tacky portions of said sheets to a solid state.

19. The method of bonding two thermoplastic bodies to one another that comprises: placing the bodies in contact with one another, sonically vibrating contacting portions of the bodies to generate heat therein until the contacting surfaces of the bodies flow plastically and bond to one another, and inducing heat flow from the fused region of said thermoplastic bodies into a cool metal body applied thereover.

20. The method of bonding two bodies to one another, at least one of which is composed of a thermoplastic material, that comprises: holding the two bodies in pressural contact, applying sonic vibration to the thermoplastic body at a surface thereof, so as to cause propagation of said vibrations through said body, continuing the application of said sonic vibrations until said thermoplastic body flows plastically at said interface, and simultaneously cooling the surface of said thermoplastic body to which said sonic vibration is applied so as to cause heat flow from said body through said surface in a direction reverse to that of the propagation of sonic vibrations into said body.

References Cited in the file of this patent

UNITED STATES PATENTS

| | | |
|---|---|---|
| 1,993,254 | Booth | Mar. 5, 1935 |
| 2,289,618 | Young | July 14, 1942 |
| 2,601,779 | Firestone | July 1, 1952 |
| 2,633,894 | Carwile | Apr. 7, 1953 |
| 2,680,470 | Stanton | June 8, 1954 |
| 2,682,294 | Langer | June 29, 1954 |
| 2,705,422 | Henry | Apr. 5, 1955 |
| 2,707,018 | Bolton | Apr. 26, 1955 |
| 2,736,144 | Thatcher | Feb. 28, 1956 |
| 2,765,837 | Kenyon | Oct. 9, 1956 |
| 2,782,140 | Vaughan | Feb. 19, 1957 |
| 2,946,119 | Jones | July 26, 1960 |
| 2,946,120 | Jones | July 26, 1960 |

UNITED STATES PATENT OFFICE
CERTIFICATE OF CORRECTION

Patent No. 3,022,814             February 27, 1962

Albert G. Bodine, Jr.

It is hereby certified that error appears in the above numbered patent requiring correction and that the said Letters Patent should read as corrected below.

Column 9, line 22, for "another sonically," read -- another, sonically --.

Signed and sealed this 14th day of August 1962.

(SEAL)
Attest:

ERNEST W. SWIDER
Attesting Officer

DAVID L. LADD
Commissioner of Patents

UNITED STATES PATENT OFFICE
CERTIFICATE OF CORRECTION

Patent No. 3,022,814                 February 27, 1962

Albert G. Bodine, Jr.

It is hereby certified that error appears in the above numbered patent requiring correction and that the said Letters Patent should read as corrected below.

Column 9, line 22, for "another sonically," read -- another, sonically --.

Signed and sealed this 14th day of August 1962.

(SEAL)
Attest:

ERNEST W. SWIDER
Attesting Officer

DAVID L. LADD
Commissioner of Patents